United States Patent [19]

Sharma et al.

[11] Patent Number: 5,629,047
[45] Date of Patent: May 13, 1997

[54] METHOD OF MAKING FUNCTIONALIZED STYRENE BUTADIENE TYPE LATEX BINDERS

[75] Inventors: Satish C. Sharma, Stow; Amiya K. Chatterjee, Hudson; Ronald D. Mohan, Akron; Friedhold Schon, N. Canton, all of Ohio

[73] Assignee: GenCorp Inc., Fairlawn, Ohio

[21] Appl. No.: 563,362

[22] Filed: Aug. 6, 1990

[51] Int. Cl.$^6$ ............................................. B05D 3/02
[52] U.S. Cl. ...................... 427/389.9; 427/391; 524/819; 524/822; 524/832
[58] Field of Search ..................... 524/819, 822, 524/832

[56] References Cited

U.S. PATENT DOCUMENTS

| | | | |
|---|---|---|---|
| 3,822,143 | 7/1974 | Wheelock | 427/391 |
| 4,474,837 | 10/1984 | Heins et al. | 427/393.4 |
| 4,808,660 | 2/1989 | Schmeing et al. | 524/812 |
| 4,831,078 | 5/1989 | Kuhara et al. | 524/821 |

FOREIGN PATENT DOCUMENTS

| | | | |
|---|---|---|---|
| 0039896 | 11/1981 | European Pat. Off. | C08F 236/10 |
| 91303266 | 11/1991 | European Pat. Off. | |

OTHER PUBLICATIONS

English translation of a Russian Chem. Abstract Article, SU 1174442 A, vol. 104, No. 24, 7 pages, Aug. 23, 1985.

Chemical Abstracts, vol. 104, No. 24.

Whitby et al, "Synthetic Rubber," 1954, pp. 213–219, 343–344 and 1039.

Billmeyer, Jr., Fred W.: *Textbook of Polymer Chemistry* 1957 (pp. 254–255).

*Primary Examiner*—Christopher Raimund
*Attorney, Agent, or Firm*—Robert F. Rywalski; Daniel J. Hudak

[57] ABSTRACT

A latex useful as a binder for paper, nonwovens, and textiles is prepared by copolymerizing in aqueous emulsion using a redox initiator at 5° C. a mixture of 35 to 60% weight of a conjugated diene monomer and from about 30 to 65% by weight of a vinyl aryl monomer. Additional improvements can be obtained by incorporating in the mixture a small percentage by weight of copolymerizable monomers such as acrylic acid, methacrylic acid, itaconic acid and/or a functional type monomer having an activatable methyl, ethyl, propyl or butyl ester group and a vinyl group.

8 Claims, No Drawings

METHOD OF MAKING FUNCTIONALIZED STYRENE BUTADIENE TYPE LATEX BINDERS

This invention relates to vinyl aryl-conjugated diene copolymers desirably containing functional comonomers as binders for paper, nonwovens, and textiles.

An object of this invention is to provide a latex binder providing improved properties for paper, nonwovens, and textiles.

This and other objects and advantages will become more apparent from the following detailed description and examples.

BRIEF STATEMENT OF THE INVENTION

It has been found that styrene-butadiene type latexes polymerized at low temperature and desirably containing small amounts of selected functional monomers provide excellent performance as binders for polyester and cellulosic substrates. The performance of these low temperature polymerized binders significantly exceeds those of the similar optimized binders prepared by the so-called hot polymerization process.

DISCUSSION OF DETAILS AND PREFERRED EMBODIMENTS

The latexes are prepared in anionic aqueous emulsion at 5° C. using a redox initiator.

Redox polymerization is known as shown by Whitby et al, "Synthetic Rubber," John Wiley & Sons, Inc. New York, 1954.

The latexes comprise:
a. a mixture of 35 to 60% by weight of at least one conjugated diene monomer having from 4 to 8 carbon atoms and from about 30 to 65% by weight of at least one vinyl aromatic monomer having from 8 to 12 carbon atoms,
b. a mixture according to a. containing additionally from about 1 to 3% by weight of at least one copolymerizable monomer selected from the group consisting of acrylic acid and methacrylic acid,
c. a mixture according to a. containing additionally from about 0.5 to 3.5% by weight of iraconic acid,
d. a mixture according to a. containing additionally from about 1 to 15% by weight at least one functional monomer having an activatable methyl, ethyl, propyl or butyl ester group and a vinyl group and
e. a mixture according to a. containing additionally from about 1 to 15% by weight of at least one functional monomer having an activatable methyl, ethyl, propyl or butyl ester group and a vinyl group and from about 1 to 0.5 to 3.5% by weight of iraconic acid.

The conjugated diene monomer is selected from the group consisting of butadiene - 1,3, (preferred), piperylene, isoprene, and 2,3-dimethyl-1, 3-butadiene.

The vinyl aromatic monomer is selected from the group consisting of styrene (preferred), alpha methyl styrene, p-tertiary butyl styrene, methyl vinyl toluene, p-vinyl toluene and 3-ethyl styrene.

The functional monomer is at least one monomer selected from the group consisting of:

methyl acrylamoidoglycolate (MAG),
ethyl acrylamidoglycolate (EAG),
butyl acrylamidoglycolate (BAG),
methyl acrylamidoglycolate methyl ether (MAGME) (Preferred),
butyl acrylamidoglycolate butyl ether (BAGBE),
methyl methacryloxyacetate,
ethyl acrylamido-N-oxalate (N-ethyloxalyl acrylamide),
N,N'-Bis(ethyloxalyl)acrylamide,
N-isopropyl, N-ethyloxalyl-3 propylamino methacrylamide,
N-ethyloxalyl-N'-methyleneaminoacrylamide,
ethyl N-2-ethyloxamatoacrylate,
ethyl 3-pyruvylacrylate,
ethyl methylenepyruvate,
methyl acrylthiocarbonyloxyacetate (Methylthiacryloxyacetate),
methyl thiacrylthioglycolate
methyl acryl-2-thiogylcolate,
methyl thiacrylamidoacetate,
methyl acrylamidoglycolate thioether,
methyl acrylamido-N-methylenethioglycolate and
p-ethyl oxalyl styrene.

These latexes contain the usual polymerization additives such as emulsifiers, chelating agents and chain transfer agents. The solids content of the latexes can vary from about 35 to 55%. The degree of polymerization can vary from about 90 to 100%. The latexes of the present invention can be used in paper, nonwovens, flooring felts, carpet backing adhesives, and so forth.

It has been found that when styrene butadiene (SB) latexes are prepared using a low temperature (5° C.) (41° F.) polymerization process, the resulting polymers have significantly improved bonding properties for polyester nonwovens compared to the polymers obtained under "hot polymerization" conditions (~65° C.) (149° F.). In some applications, this improvement in performance is so large that the low temperature polymerized SB binders (no functional monomers added) perform even better than the hot polymerized binders which contain some functional monomers (e.g. acrylic acid, iraconic acid, MAGME). The addition of functional monomers during low temperature polymerization further improves the performance of these binders relative to those not containing the functional monomers. Also, it has been found that the low temperature polymerized SB latexes containing MAGME perform significantly better than the corresponding hot polymerized latexes as binders for cellulosic substrates.

The following example will serve to illustrate the present invention with more particularity to those skilled in the art.

EXAMPLE I

Preparation of Latexes

All polymerizations were carried out at 5° C. in quart size glass bottles using the general recipe (based on 150 parts of total monomer charge) and the procedures given below (Table I).

TABLE I

| | LATEX | | | | | |
|---|---|---|---|---|---|---|
| | A | B | C | D | E | F |
| INGREDIENTS | | | | | | |
| Solution A | 220.5 | 220.5 | 220.5 | 220.5 | — | — |
| Solution B | — | — | — | — | 167.3 | — |

TABLE I-continued

| | LATEX | | | | | |
|---|---|---|---|---|---|---|
| | A | B | C | D | E | F |
| Solution C | — | — | — | — | — | 167.3 |
| Acrylic Acid | — | 1.5 | 3.0 | — | — | — |
| Itaconic Acid | — | — | — | 1.5 | 0.43 | — |
| Solution D | — | — | — | — | 57.7 | 57.7 |
| Deionized Water | — | — | — | — | 3.0 | 3.0 |
| Solution E | 79.5 | 79.5 | 79.5 | 79.5 | 78.0 | 79.5 |
| Styrene | 11.25 | 9.75 | 8.25 | 9.75 | 3.0 | 3.75 |
| Butadiene | 60.0 | 60.0 | 60.0 | 60.0 | 60.0 | 60.0 |
| Solution F[(1)] | 15.0 | 15.0 | 15.0 | 15.0 | 15.0 | 15.0 |

[(1)]Added after cooling the reactants to 5° C.

| | |
|---|---|
| Solution A | 2.2 gm $Na_3PO_4.12\ H_2O$ + 73.5 gm Dowfax 2A1 (45% by weight) + 3157.9 gm deionized water. |
| Solution B | 1.1 gm $Na_3PO_4.12\ H_2O$ + 36.8 gm Dowfax 2A1 (45% by weight) + 13.5 gm itaconic acid + 1188.9 gm deionized water. |
| Solution C | 1.1 gm $Na_3PO_4.12H_2O$ + 36.8 gm Dowfax 2A1 (45% by weight) + 1188.9 gm deionized water. |
| Solution D | 13% (by weight) MAGME in deionized water |
| Solution E | 1075 gm styrene + 8.0 gm Sulfole 120 + 2.0 gm p-menthane hydroperoxide (50% by weight). |
| Solution F | 1.06 gm Sequestrene AA + 1.34 gm sodium formaldehyde sulfoxylate + 0.54 gm $FeSO_4.7\ H_2O$ + 5.4 gm NaOH (10% by weight) + 261.4 gm deionized water |

Procedure

The ingredients were added in the order listed and mixed well after each addition using a magnetic stirrer. Before the addition of butadiene-1,3, the bottles were sparged with $N_2$ for 10 minutes. The required amount of butadiene was then added, the bottles were capped and placed in the 5° C. bath for 1 hour. Solution F was then added through the cap using a syringe. All bottles were reacted to vacuum at 5° C. Table II gives the weight percent of monomers charged for each latex and some of the properties of the resulting latexes.

TABLE II

| | A | B | C | D | E | F |
|---|---|---|---|---|---|---|
| MONOMERS | | | | | | |
| Styrene | 60 | 59 | 58 | 59 | 53.5 | 55 |
| Butadiene | 40 | 40 | 40 | 40 | 40 | 40 |
| Acrylic Acid | — | 1 | 2 | — | — | — |
| MAGME | — | — | — | — | 5 | 5 |
| Itaconic Acid | — | — | — | 1 | 1.5 | — |
| Total Solids, % | 38.23 | 39.35 | 39.59 | 39.45 | 37.13 | 39.54 |
| pH | 10.14 | 4.77 | 4.31 | 4.72 | 3.09 | 4.24 |
| Brookfield Viscosity, cps | 2800 | 610 | 1110 | 1140 | 40.5 | 225 |

The effectiveness of the above latexes as binders for polyester and cellulosic substrates was evaluated as follows.

Cellulosic Substrate

Whatman #4 chromatographic paper die-cut to 8"×10" was used. The sheets were saturated with the latex using a laboratory padder. The targeted binder add-on was 21.0±1% by weight. The saturated sheets were air dried at room temperature and then cured on a steam heated dryer at 315° F. for 15, 30, 180, and 240 seconds. All sheets were conditioned in accordance with TAPPI test method T402. The tensile strength was determined using 1" wide strips cut from the sheets in the machine direction (MD) and the cross direction (CD). For wet tensiles, the samples were immersed in distilled water and completely wetted before testing. All reported tensile values represent wet total (MD+CD) tensile normalized to the average basis weight and average binder add-on of 74.6#/3000 ft.[2] ream and 21.0%, respectively.

Polyester Substrate

A carded web consisting of 1.5 dpf×1.5" polyester was used. Die-cut 8"×10"sheets were saturated with the latex using a laboratory padder. Saturation was conducted by placing the web between two thicknesses of fiberglass window screen, immersing in the latex and removing the excess liquid by passing between pressure-controlled rubber and stainless steel rolls. Targeted binder add-on was 35±2% by weight (based on final total dry weight).

The saturated polyester sheets were first dried in a hot air oven at 250° F. for 5 minutes and then cured in a hot air oven at 320° F. for 30 seconds.

The tensile strengths were determined on the 1" wide strips cut in the MD and CD directions. For wet tensile determination, the strips were immersed in distilled water until completely wetted and then tested. The reported values represent the average of 12 samples each.

The polyester application results for the latexes of this invention are given in Table III. For comparative purposes, two hot polymerized latexes, X and Y, which are not part of this invention but contain some of the monomers contained in latexes A–F were also included in this evaluation. The data in Table III clearly show the following:

(1) Low temparature polymerized Latex A which contains only styrene and butadiene performs significantly better than comparative Latex X which contains functional monomers MAGME, IA, and AAD in wet tensile strength. Also the wet tensile strength with Latex A is more than double that of the corresponding value obtained with comparative Latex Y which contains functional monomers IA and methacrylic acid.

(2) The addition of 1–2 parts of AA (Latexes B and C), 1 part of IA (Latex D), or 5 parts of MAGME (Latex F) during the low temperature polymerization further improves the performance of these binders. Wet tensile strengths exceeding double of that obtained with Latex X are achievable even without MAGME (Latexes, B, C, and D).

(3) A further increase in wet and dry tensiles is possible when both MAGME and IA are present (Latex E).

Another observation is that in addition to an increase in the dry and wet tensile observed with the low temperature polymerized latexes relative to that of the hot polymerized latexes, the binders of this invention retain a higher percentage of their dry strength under wet conditions (74.9–90.3%) than that for the hot polymerized binders (47.9–56.7%) (bottom row, Table III).

TABLE III

POLYESTER APPLICATION RESULTS

| | LATEX | | | | | | | |
|---|---|---|---|---|---|---|---|---|
| | A | B | C | D | E | F | X(1) | −Y(2) |
| Basis Weight | 21.1 | 22.3 | 21.5 | 22.1 | 21.6 | 21.6 | 21.0 | 22.0 |
| Add-On, % | 35.4 | 36.1 | 36.7 | 35.1 | 35.1 | 35.6 | 33.8 | 37.3 |
| Wet Tensile[3] | | | | | | | | |
| MD | 2520 | 3585 | 3321 | 3656 | 3844 | 3460 | 1755 | 1099 |
| CD | 372 | 547 | 523 | 690 | 776 | 687 | 239 | 125 |
| Total Dry Tensile[3] | 2892 | 4132 | 3844 | 4346 | 4620 | 4147 | 1994 | 1224 |
| MD | 3326 | 3831 | 3795 | 4069 | 4495 | 4178 | 3038 | 2259 |
| CD | 533 | 745 | 713 | 768 | 961 | 871 | 480 | 294 |
| Total | 3859 | 4576 | 4508 | 4837 | 5456 | 5049 | 3518 | 2553 |
| $\frac{\text{Total Wet}}{\text{Total Dry}} \times 100$ | 74.9 | 90.3 | 85.3 | 89.8 | 84.7 | 82.1 | 56.7 | 47.9 |

[1]Not part of this invention. A hot polymerized (65° C.) latex, containing 5 parts MAGME, 1.5 parts itaconic acid, 2.0 parts acrylamide (AAD), 40 parts butadiene, and 51.5 parts styrene as per U.S. Pat. No. 4,808,660.
[2]Not part of this invention. A hot polymerized (65° C.) latex containing 1.5 parts itaconic acid, 0.25 parts methacrylic acid, 46.1 parts styrene, and 51.7 parts butadiene.
[3]All tensile values are in gm/inch.

Table IV gives the Normalized Wet Total Tensile (NWTT) data for the application of low temperature polymerized latexes as binders for a cellulosic substrate (Whatman #4). Also shown in Table IV is the corresponding data for a comparative latex (Latex X) according to the teachings of U.S. Pat. No. 4,808,660. From the data in Table IV, it is seen that Latexes E and F of this invention perform significantly better than the corresponding comparative Latex X. Specifically, Latexes E and F provide a 16–22% increase in maximum NWTT and a 33–38% increase in NWTT at 15 seconds cure time as compared to the corresponding values for Latex X. Latexes E and F are, therefore, faster curing than Latex X and provide a higher ultimate NWTT than that for Latex X. This is particularly significant because Latexes E and F provide this improved performance without the use of AAD which is contained in Latex X and which, according to the teachings of U.S. Pat. 4,808,660, provides a synergistic effect when used together with MAGME.

TABLE IV

CELLULOSIC (WHATMAN #4) APPLICATION RESULTS

| | LATEX | | | | | | |
|---|---|---|---|---|---|---|---|
| | A | B | C | D | E | F | X[1] |
| Cure Time[2] (seconds) | | | | | | | |
| 15 | 7.7 | 4.4 | 4.9 | 12.1 | 31.6 | 30.5 | 22.9 |
| 30 | 7.9 | 5.0 | 5.1 | 19.4 | 32.5 | 34.8 | 25.9 |
| 180 | 9.7 | 9.0 | 9.3 | 29.3 | 35.1 | 36.8 | 30.2 |
| 240 | 10.2 | 9.4 | 10.1 | 28.1 | 34.9 | 35.2 | 29.9 |

[1]Not part of this invention. A hot polymerized (65° C.) latex containing 5 parts MAGME, 1.5 parts itaconic acid, 2.0 parts acrylamide, 40 parts butadiene, and 51.5 parts styrene as per U.S. Pat. No. 4,808,660.
[2]At 315° F.
[3]All tensile values are in lbs./inch.

The data in Table IV also show that even for Latex D of this invention which contains only 1.5 pphm itaconic acid as the functional monomer, the highest NWTT attained (29.3 lbs./inch) approaches that for Latex X (30.2 lbs./inch). Latex D does not contain MAGME. Thus, Latex D may be desirable for cellulosic applications that do not require fast curing.

As may be seen in Table IV, Latexes A, B, and C may not be as suitable as binders for cellulosics even though these latexes make excellent binders for polyester substrates (Table III).

EXAMPLE II

In another set of statistically designed experiments, the effect of varying the levels of MAGME, itaconic acid, butadiene, Sulfole 120, and Dowfax 2A1 on the performance of the resulting latexes was studied. Latexes were prepared according to the procedure described in Example I. Table V shows the amount of MAGME, itaconic acid, butadiene, styrene, Sulfole 120, and Dowfax 2A1 added per hundred parts of the total monomers charged.

The polyester application results for these latexes are given in Table VI. These results clearly demonstrate that the latexes of this invention provide excellent binding properties over the entire range of compositions studied (Table V).

Table VII gives the Normalized Wet Total Tensile (NWTT) data for the application of the latexes of Table V as binders for the cellulosic substrate (Whatman #4). These data show that an increase in the MAGME level increases both the cure rate (NWTT at 15 seconds) and the maximum NWTT attainable. An increase in the itaconic acid level has a similar, though a somewhat smaller, effect on the cure rate and the maximum NWTT. An increase in the butadiene level decreases the maximum NWTT but the cure rate is not affected signifcantly. Thus, a significant latitutde in butadiene content of these latexes is available by adjusting the MAGME and itaconic acid levels.

The data in Tables VI and vII also show that the variations in the Sulfole 120 and Dowfax 2A1 levels have no adverse effect on the properties of these binders.

TABLE V

| Ingredients\Latex | G | H | J | K | L | M | N | O | P | Q | R | S | T | U | V | W |
|---|---|---|---|---|---|---|---|---|---|---|---|---|---|---|---|---|
| Styrene | 63.5 | 59.5 | 61.5 | 57.5 | 53.5 | 49.5 | 51.5 | 47.5 | 63.5 | 59.5 | 61.5 | 57.5 | 53.5 | 49.5 | 51.5 | 47.5 |
| Butadiene | 35 | 35 | 35 | 35 | 45 | 45 | 45 | 45 | 35 | 35 | 35 | 35 | 45 | 45 | 45 | 45 |
| MAGME | 1 | 5 | 1 | 5 | 1 | 5 | 1 | 5 | 1 | 5 | 1 | 5 | 1 | 5 | 1 | 5 |
| Itaconic Acid | 0.5 | 0.5 | 2.5 | 2.5 | 0.5 | 0.5 | 2.5 | 2.5 | 0.5 | 0.5 | 2.5 | 2.5 | 0.5 | 0.5 | 2.5 | 2.5 |
| Sulfole 120 | 0.3 | 0.3 | 0.3 | 0.3 | 0.3 | 0.3 | 0.3 | 0.3 | 0.5 | 0.5 | 0.5 | 0.5 | 0.5 | 0.5 | 0.5 | 0.5 |
| Dowfax 2Al | 1.5 | 1.0 | 1.0 | 1.5 | 1.0 | 1.5 | 1.5 | 1.0 | 1.0 | 1.5 | 1.5 | 1.0 | 1.5 | 1.0 | 1.0 | 1.5 |

TABLE VI

POLYESTER APPLICATION RESULTS

| | LATEX | | | | | | | | |
|---|---|---|---|---|---|---|---|---|---|
| | G | H | J | K | L | M | N | O | P |
| Basis Wt. | 20.4 | 21.6 | 21.3 | 23.1 | 22.7 | 21.7 | 21.8 | 22.0 | 21.1 |
| Add-On, % | 34.1 | 37.7 | 36.4 | 38.7 | 37.7 | 37.6 | 36.4 | 38.6 | 36.7 |
| Total Dry Tensile (1) | 3621 | 3776 | 3863 | 4792 | 3194 | 3742 | 3954 | 4144 | 3371 |
| Total Wet Tensile (1) | 3690 | 4449 | 4572 | 4244 | 3528 | 3296 | 2929 | 4037 | 2869 |

| | Q | R | S | T | U | V | W |
|---|---|---|---|---|---|---|---|
| Basis Wt. | 21.7 | 21.8 | 22.2 | 21.2 | 21.7 | 22.1 | 21.5 |
| Add-On, % | 38.4 | 36.9 | 38.1 | 36.6 | 37.6 | 36.6 | 34.0 |
| Total Dry Tensile (1) | 4533 | 4334 | 4440 | 3541 | 3891 | 4268 | 4291 |
| Total Wet Tensile (1) | 3575 | 3953 | 4237 | 3186 | 3832 | 3473 | 3841 |

(1) All tensile values are in gm\inch

TABLE VII

CELLULOSIC (WHATMAN #4) APPLICATION RESULTS

| Curing Time (1) (Seconds) (2) | LATEX | | | | | | | | | | | | | | | |
|---|---|---|---|---|---|---|---|---|---|---|---|---|---|---|---|---|
| | G | H | J | K | L | M | N | O | P | Q | R | S | T | U | V | W |
| 15 | 14.9 | 23.9 | 22.2 | 26.1 | 14.7 | 23.5 | 20.3 | 25.0 | 16.8 | 25.2 | 22.6 | 26.9 | 13.3 | 21.8 | 18.7 | 24.8 |
| 30 | 17.1 | 24.6 | 22.3 | 26.1 | 15.3 | 23.3 | 20.6 | 27.3 | 17.6 | 25.3 | 22.6 | 27.0 | 14.5 | 22.6 | 20.0 | 24.4 |
| 180 | 26.1 | 27.3 | 26.6 | 29.0 | 21.6 | 25.8 | 25.3 | 29.1 | 24.4 | 28.0 | 26.9 | 27.2 | 21.5 | 25.4 | 23.2 | 25.6 |
| 240 | 25.9 | 27.4 | 27.1 | 28.8 | 22.1 | 25.5 | 24.9 | 28.9 | 24.7 | 28.5 | 27.4 | 26.6 | 22.1 | 25.0 | 23.6 | 25.5 |

(1) At 315° F.
(2) All tensile values are lbs/inch

Notes

"Dowfax"2A1—alkylated disulfonate diphenyloxide

Sulfole 120—t-dodecyl mercaptan, avg. mol. wt. 198, calc purity wt. 96.8%

Sequestrene AA—ethylene diamine tetraacctic acid

We claim:

1. The method of making copolymers useful as binders for paper, nonwoven and textile substrates comprising; copolymerizing in aqueous emulsion using a redox initiator at 5° C. a:

a. mixture of 35 to 60% by weight of at least one conjugated diene monomer having from 4 to 8 carbon atoms and from about 30 to 65% by weight of at least one vinyl aromatic monomer having from 8 to 12 carbon atoms, or b. mixture according to a. containing additionally from about 1 to 3% by weight of at least one copolymerizable monomer selected from the group consisting of acrylic acid and methacrylic acid, or c. mixture according to a. containing additionally from about 0.5 to 3.5% by weight of itaconic acid, or d. mixture according to a. containing additionally from about 1 to 15% by weight of at least one functional monomer having an activatable methyl, ethyl, propyl or butyl ester group and a vinyl group, or e. mixture according to a. containing additionally from about 1 to 15% by weight of at least one functional monomer having an activatable methyl, ethyl, propyl or butyl ester group and a vinyl group and from about 0.5 to 3.5% by weight of itaconic acid, forming a latex, and subsequently curing said latex to produce a cured latex imparting improved tensile strength to the substrate.

2. The method according to claim 1 where said conjugated diene monomer is selected from the group consisting of butadiene -1,3, (preferred) piperylene, isoprene and 2,3 dimethyl -1,3- butadiene, where said vinyl aromatic monomer is selected from the group consisting of styrene (preferred), alpha methyl styrene, p-tertiary butyl styrene, methyl vinyl toluene, p-vinyl toluene and 3-ethyl styrene and where said functional monomer is at least one monomer selected from the group consisting of:
methyl acrylamidoglycolate (MAG),
ethyl acrylamidoglycolate (EAG),
butyl acrylamidoglycolate (BAG),
methyl acrylamidoglycolate methyl ether (MAGME) (Preferred),
butyl acrylamidoglycolate butyl ether (BAGBE),
methyl methacryloxyacetate,
ethyl acrylamido-N-oxalate (N-ethyloxalyl acrylamide),
N,N'-Bis(ethyloxalyl)acrylamide, N-isopropyl, N-ethyloxalyl-3 propylamino methacrylamide,
N-ethyloxalyl-N'-methyleneaminoacrylamide,
ethyl N-2-ethyloxamatoacrylate,
ethyl 3-pyruvylacrylate,
ethyl methylenepyruvate,
methyl acrylthiocarbonyloxyacetate (Methyl thiacryloxyacetate),
methyl thiacrylthioglycolate
methyl acrylamidoglycolate thioether,
methyl acrylamido-N-methylenethioglycolate and
p-ethyl oxalyl styrene.

3. A method according to claim 1, wherein said curing of said latex occurs after application to paper, a nonwoven, or a textile.

4. A method according to claim 2, wherein said curing of said latex occurs after application to paper, a nonwoven, or a textile.

5. The method of making copolymers useful as binders for paper, nonwovens and textiles comprising; copolymerizing in aqueous emulsion using a redox initiator at 5° C. a:

a. mixture of 35 to 60% by weight of at least one conjugated diene monomer having from 4 to 8 carbon atoms and from about 30 to 65% by weight of at least one vinyl aromatic monomer having from 8 to 12 carbon atoms, and containing additionally from about 1 to 15% by weight of at least one functional monomer having an activatable methyl, ethyl, propyl or butyl ester group and a vinyl group, or from about 1 to 15% by weight of at least one functional monomer having an activatable methyl, ethyl, propyl or butyl ester group and a vinyl group and from about 0.5 to 3.5% by weight of itaconic acid, forming a latex, and subsequently curing said latex.

6. The method according to claim 5, where said conjugated diene monomer is selected from the group consisting of butadiene -1,3, (preferred) piperylene, isoprene and 2,3 dimethyl -1,3-butadiene, where said vinyl aromatic monomer is selected from the group consisting of styrene (preferred), alpha methyl styrene, p-tertiary butyl styrene, methyl vinyl toluene, p-vinyl toluene and 3-ethyl styrene and where said functional monomer is at least one monomer selected from the group consisting of:
methyl acrylamidoglycolate (MAG),
ethyl acrylamidoglycolate (EAG),
butyl acrylamidoglycolate (BAG),
methyl acrylamidoglycolate methyl ether (MAGME) (Preferred),
butyl acrylamidoglycolate butyl ether (BAGBE),
methyl methacryloxyacetate,
ethyl acrylamido-N-oxalate (N-ethyloxalyl acrylamide),
N,N'-Bis(ethyloxalyl)acrylamide,
N-isopropyl, N-ethyloxalyl-3propylaminomethacrylamide,
N-ethyloxalyl-N'-methyleneaminoacrylamide,
ethyl N-2-ethyloxamatoacrylate,
ethyl 3-pyruvylacrylate,
ethyl methylenepyruvate,
methyl acrylthiocarbonyloxyacetate (Methyl thiacryloxyacetate),
methyl thiacrylthioglycolate,
methyl acrylamidoglycolate thioether,
methyl acrylamido-N-methylenethioglycolate, and
p-ethyl oxalyl styrene.

7. A method according to claim 5, wherein said curing of said latex occurs after application to paper, a nonwoven, or a textile.

8. A method according to claim 6, wherein said curing of said latex occurs after application to paper, a nonwoven, or a textile.

* * * * *